United States Patent
Wei et al.

(10) Patent No.: US 10,020,907 B2
(45) Date of Patent: Jul. 10, 2018

(54) TRANSPORT FUNCTIONS VIRTUALIZATION FOR WAVELENGTH DIVISION MULTIPLEXING (WDM)-BASED OPTICAL NETWORKS

(71) Applicant: Futurewei Technologies, Inc., Plano, TX (US)

(72) Inventors: Wei Wei, Plano, TX (US); Congqi Li, Shenzhen (CN); Lei Lan, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/073,416

(22) Filed: Mar. 17, 2016

(65) Prior Publication Data

US 2016/0204893 A1    Jul. 14, 2016

Related U.S. Application Data

(63) Continuation of application No. 14/047,282, filed on Oct. 7, 2013, now Pat. No. 9,350,481.
(Continued)

(51) Int. Cl.
   *H04J 14/02*    (2006.01)

(52) U.S. Cl.
   CPC ...... *H04J 14/0227* (2013.01); *H04J 14/0257* (2013.01); *H04J 14/0267* (2013.01);
(Continued)

(58) Field of Classification Search
None
See application file for complete search history.

(56) References Cited

U.S. PATENT DOCUMENTS

| 7,009,934 B1 | 3/2006 | Perkins et al. |
| 7,515,589 B2 | 4/2009 | Bacher et al. |

(Continued)

FOREIGN PATENT DOCUMENTS

WO    2010105248 A1    9/2010

OTHER PUBLICATIONS

Peng, et al., "An Impairment-aware Virtual Optical Network Composition Mechanism for Future Internet", ECOC Technical Digest, Jul. 27, 2011, 3 pages.
(Continued)

*Primary Examiner* — Darren E Wolf
(74) *Attorney, Agent, or Firm* — Conley Rose, P.C.

(57) ABSTRACT

A method for virtualizing an optical network, comprising: abstracting optical resource information corresponding to resources within the optical network, constructing a plurality of candidate paths for one or more optical reachability graph (ORG) node pairs, determining whether the candidate paths are optical reachable paths, and creating an ORG link between each ORG node pair when at least one optical reachable path exists for the ORG node pair, wherein linking the ORG node pairs creates an ORG. In another embodiment, a computer program product comprising executable instructions when executed by a processor causes a node to perform the following: determine an optical network's optical-electrical-optical (OEO) conversion capability, partition a plurality of service sites into one or more electrical reachability graph (ERG) nodes, determine a grooming capability for each ERG node, and construct a plurality of electrical-layer reach paths between the ERG nodes to form an ERG.

18 Claims, 11 Drawing Sheets

Related U.S. Application Data

(60) Provisional application No. 61/711,011, filed on Oct. 8, 2012.

(52) U.S. Cl.
CPC ......... *H04J 14/0271* (2013.01); *H04J 14/026* (2013.01); *H04J 14/0254* (2013.01); *H04J 14/0258* (2013.01); *H04J 14/0264* (2013.01); *H04J 14/0269* (2013.01)

(56) References Cited

U.S. PATENT DOCUMENTS

| | | |
|---|---|---|
| 2002/0021466 A1 | 2/2002 | Abrams |
| 2002/0176363 A1 | 11/2002 | Durinovic-Johri et al. |
| 2004/0047549 A1 | 3/2004 | Farnham et al. |
| 2004/0208570 A1 | 10/2004 | Reader |
| 2005/0220143 A1 | 10/2005 | DelRegno et al. |
| 2006/0002291 A1 | 1/2006 | Alicherry et al. |
| 2010/0104281 A1 | 4/2010 | Dhillon et al. |
| 2011/0185082 A1 | 7/2011 | Thompson |

OTHER PUBLICATIONS

Wei, et al. "Cognitive Optical Networks: Key Drivers, Enabling Techniques, and Adaptive Bandwidth Services", IEEE Communications Magazine, Jan. 2012, 8 pages.

Gerstel, et al., "Elastic Optical Networking: A New Dawn for the Optical Layer?", IEEE Communications Magazine, Feb. 2012, 9 pages.

Gringeri, et al., "Flexible Architectures for Optical Transport Nodes and Networks", IEEE Communications Magazine, Jul. 2010, 11 pages.

Gagnaire, et al., "Impairment-Aware Routing and Wavelength Assignment in Translucent Networks: State of the Art", IEEE Communications Magazine, May 2009, 7 pages.

Liu, et al., "Interworking between OpenFlow and PCE for Dynamic Wavelength Path Control in Multi-domain WSON", OFC/NFOEC Technical Digest, Jan. 23, 2012, 3 pages.

Chowdhury, et al., "Network Virtualization: State of the Art and Research Challenges", IEEE Communications Magazine, Jul. 2009, 7 pages.

Azodolmolky, et al., "Optical Flow Visor: An OpenFlow-based Optical Network Virtualization Approach", OFC/NFOEC Technical Digest, Jan. 23, 2012, 3 pages.

"Software-Defined Networking: The New Norm for Networks", Open Networking Foundation, ONF White Paper, Apr. 13, 2012, 12 pages.

Xu, et al., "SRLG-Diverse Routing of Multiple Circuits in a Heterogeneous Optical Transport Network", 8th International Workshop on the Design of Reliable Communication Networks (DRCN), Krakow, Poland, Oct. 2011, 8 pages.

Schmitt, A., "Integrated OTN Switching Virtualizes Optical Networks", Infonetics Research White Paper, Infonetics Research, Inc., Jun. 2012, 12 pages.

Roberts, et al., "DSP: A Disruptive Technology for Optical Transceivers", European Conference on Optical communication, Vienna, Austria, Sep. 2009, 4 pages.

Gu, et al., "Virtual Network Reconfiguration on Optical Substrate Networks", Optical Fiber Communication Conference and Exposition and the National Fiber Optic Engineers Conference (OFC/NFOEC), Anaheim, California, Mar. 2013, 4 pages.

Matsumoto, C., "Internet2 Readies Its SDN Launch", Light Reading: Networking the Telecom Community, http://www.lightreading.com/document.asp?doc_id=698579&init_gateway=true, Sep. 25, 2012, 6 pages.

Yu, et al., "Rethinking Virtual Network Embedding: Substrate Support for Path Splitting and Migration", ACM SIGCOMM Computer Communication Review, vol. 38, No. 2, Apr. 2008, 11 pages.

Jinno, et al., "Spectrum-Efficient and Scalable Elastic Optical Path Network: Architecture, Benefits, and Enabling Technologies", IEEE Communications Magazine, Nov. 2009, 8 pages.

Azodolmolky, et al., "Integrated OpenFlow—GMPLS Control Plane: An Overlay Model for Software Defined Packet over Optical Networks", 37th European Conference and Exhibition on Optical Communication, Geneva, Switzerland, Sep. 2011, 3 pages.

Foreign Communication From a Counterpart Application, PCT Application No. PCT/US2013/063655, International Search Report dated Jan. 8, 2014, 5 pages.

Foreign Communication From a Counterpart Application, PCT Application No. PCT/US2013/063655, Written Opinion dated Jan. 8, 2014, 6 pages.

Chava, V. S., et al., "Impairment and Regenerator Aware Lightpath Setup Using Distributed Reachabiliy Graphs," IEEE Conference on Computer Communications Workshops (INFOCOM WKSHPS), Apr. 10-15, 2011, 6 pages.

Huang, S., et al., "Dynamic Traffic Grooming: The Changing Role of Traffic Grooming," IEEE Communications Surveys, The Electronic Magazine of Original Peer-Review Survey Articles, Jan. 1, 2007, vol. 8, No. 4, 18 pages.

Office Action dated Dec. 29, 2014, U.S. Appl. No. 14/047,282 filed Oct. 7, 2013, 8 pages.

Office Action dated Apr. 9, 2015, U.S. Appl. No. 14/047,282, filed Oct. 7, 2013, 22 pages.

Notice of Allowance dated Feb. 17, 2016, U.S. Appl. No. 14/047,282, filed Oct. 7, 2013; 7 pages.

TRANSPORT FUNCTIONS VIRTUALIZATION FOR WAVELENGTH DIVISION MULTIPLEXING (WDM)-BASED OPTICAL NETWORKS

CROSS-REFERENCE TO RELATED APPLICATION

This application is a continuation application of U. S. patent application Ser. No. 14/047,282 filed Oct. 7, 2013 by Wei Wei, et al., and titled "Transport Functions Virtualization for Wavelength Division Multiplexing (WDM)-based Optical Networks," which claims priority to U. S. Prov. Patent App. No. 61/711,011 filed Oct. 8, 2012 by Wei Wei, et al. and titled "Systems and Methods for Transport Network Virtualization," which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As Internet traffic continues to dramatically increase, today's communication and data networks face many challenges to support and manage the vast amounts of Internet data. Specifically, modern optical networks are constantly faced with demands to increase bandwidth for a single-wavelength, implement flexible connection requests, and provide on-the-fly support for new applications, such as network virtualization. One method to improve modern optical networks has been the advancement in optical coherent communication technologies that create software-defined cognitive optical networks (CONs). CONs can support reprogramming of hardware transmission logic and new network applications (e.g. adaptive bandwidth services) by using intelligent software, such as digital signal processing (DSP) software in the optical transport plane and generalized multi-protocol label switching (GMPLS) in the optical control plane, and flexible hardware, such as bandwidth-variable reconfigurable optical add/drop multiplexers (ROADMs) and optical orthogonal frequency-division multiplexers (OOFDMs).

Additionally, with a surge of data center applications like cloud computing and pressure to reduce capital expenditure (CAPEX) and operating expenditure (OPEX) for service providers, the trend in the telecommunication industry has been to integrate packet transport platforms with optical transport platforms. Some examples of integrating transport platforms with optical transport platforms include Ethernet over optical transport network (OTN), Internet Protocol (IP) over wavelength division multiplexing (WDM), and GMPLS unified control plane technologies. However, integrating transport platforms with optical transport platforms creates complex networks that are often difficult to manage, inflexible, and may not be service extensible. For instance, managing a packet-optical transport network may involve using highly adaptive service provisioning. The transport functions may need to not only provide bandwidth-on-demand (BoD) between a pair of source and destination nodes to accommodate dynamic packet flows efficiently, but also provide reliable circuit among a set of nodes with minimum delay and different bandwidth granularities to form an application-specific virtual network (e.g. virtual network service).

The latest effort in managing an integrated packet-optical transport network has been the development of Software-Defined Networking (SDN), path computation element (PCE) protocols, and Open Flow (OF) protocols. Fundamentally, SDN decouples the control and forward planes within a network and uses a centralized controller to manage the control plane functions. The combination of SDN and OF can create highly scalable Ethernet switch networks by virtualizing the layer 2 (L2) and layer 3 (L3) data center network. The SDN virtualization may also virtualize L2/L3/layer 4 (L4) switches, routers, and firewalls in terms of sharing IP/media access control (MAC) addresses and improve forwarding bandwidth among a variety of higher layer clients. Unfortunately, the existing L2 and L3 virtualization approaches are unable to guarantee deterministic latency, jitter, and resilience for a variety of circuit services, as L2 and L3 switches intrinsically have relative poor bandwidth isolation capability. Furthermore, current SDN development focuses on virtualization of packet networks and does not provide for virtualization of WDM transport networks.

SUMMARY

In one embodiment, the disclosure includes a method for virtualizing transport functions in an optical network, comprising: abstracting optical resource information corresponding to resources within the optical network, constructing a plurality of candidate paths for one or more optical reachability graph (ORG) node pairs, determining whether the candidate paths are optical reachable paths, and creating an ORG link between each ORG node pair when at least one optical reachable path exists for the ORG node pair, wherein linking the ORG node pairs creates an ORG.

In another embodiment, the disclosure includes a computer program product comprising computer executable instructions stored on a non-transitory medium that when executed by a processor causes a node to perform the following: determine an optical physical network's optical-electrical-optical (OEO) conversion capability, partition a plurality of service sites into one or more electrical reachability graph (ERG) nodes, determine a grooming capability for each ERG node, and construct a plurality of electrical-layer reach paths between the ERG nodes to form an ERG.

In yet another embodiment, the disclosure includes an apparatus for virtualizing a optical network, comprising a memory comprising an ORG module and an ERG module, a processor coupled to the memory, wherein the processor executes the ORG module to cause the apparatus to perform the following: maintain optical transmission engineering rules for the optical network, maintain shared-risk-link-groups (SRLGs) for the optical network, determine a plurality of optical reachable paths using the optical transmission engineering rules and the SRLGs, and construct an ORG by interconnecting a plurality of ORG nodes via optical reachable paths, wherein the processor executes the ERG module to cause the apparatus to perform the following: partition the ORG nodes into a plurality of ERG nodes that perform grooming functions, determine a plurality of electrical-layer reachable paths for the ERG nodes, and construct an ERG over the ORG by interconnecting the ERG nodes with the electrical-layer reachable paths.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
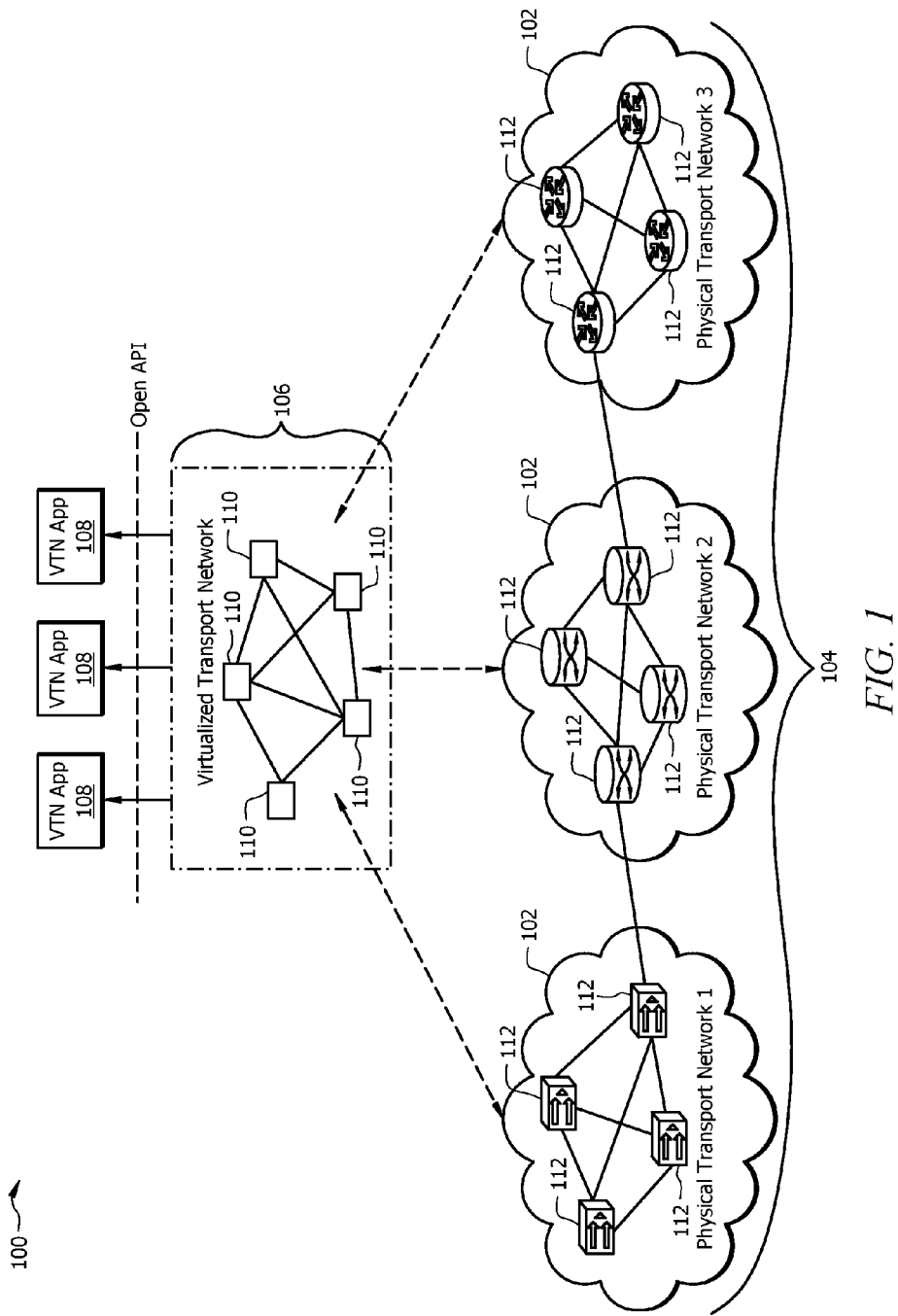
FIG. 1 is a schematic diagram of an embodiment of a system comprising two domains and an external entity where embodiments of the present disclosure may operate.

It should be understood at the outset that, although an illustrative implementation of one or more embodiments are provided below, the disclosed systems, apparatuses, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

In contrast to existing L2/L3 virtualization, virtualization of WDM-based optical networks may support transport functions that guarantee bandwidth partition and isolation capabilities with varying degrees of performance. Transport functions virtualization may be capable of perceiving physical fiber network transmission performance and reconfiguring the WDM-based optical networks accordingly (e.g. traffic engineering). For example, software-defined optical transponders in the WDM-based optical networks are designed to operate in a flexible manner. The software-defined optical transponder may reduce the number of optical regenerators (e.g. re-time, re-transmit, re-shape (3R) regenerators) when each optical-path has a relatively small Optical Signal-To-Noise Ratio (OSNR) margin. Conversely, when the OSNR margins are relatively larger for each optical-path, the transponders may increase the transmission throughput.

Disclosed herein are at least one method, apparatus, and system that virtualize an optical network. A two-tier network virtualization layer may be created by abstracting various optical and electrical resources within the physical WDM optical substrate layer (e.g. physical fiber network) into two types of resource databases. The first resource database produces an ORG that abstracts optical transmission capability to form a transmission-capability-connectivity topology. In one embodiment, the transmission-capability-topology may hide the optical impairments and wavelength-continuity constraints from routing and wavelength assignment (RWA) algorithms to prevent the wavelength-level service provisioning and restoration from analyzing detailed physical fiber transmission attributes. The second resource database may produce an ERG that builds an electrical-optical channel logical topology using optical reachable paths obtained in the ORG. In one embodiment, the ERG may hide electrical constraints, such as electrical backplanes between different sub-racks and regenerators. An Open application programming interface (API) interface may be used to communicate and provide bandwidth pool information to higher-layer controllers (e.g. client interfaces) via a northbound interface.

FIG. 1 is a schematic diagram of an embodiment of a transport network 100 where embodiments of the present disclosure may operate. Transport network 100 may comprise a physical WDM optical substrate layer 104 and a virtualized transport network 106. The physical WDM optical substrate layer 104 may comprise one or more physical transport networks 102. As shown in FIG. 1, the physical WDM optical substrate layer 104 may include three different physical transport networks 102. The physical transport networks 102 may be WDM networks, OTN-based transport networks, and/or any other type of optical physical network used to transport optical data. The physical transport networks 102 may comprise optical nodes 112 that may be legacy WDM optical devices and/or programmable optical devices. The optical nodes 112 may be layer 0 (L0)/layer 1 (L1) optical and/or optical-electrical network devices, such as ROADMs and OTN switches. In one embodiment, the optical nodes 112 may be produced by one or more vendors. Moreover, the optical nodes 112 may be programmable in a variety of parameters that include, but are not limited to wavelength (e.g. tunable laser and/or filter), waveband (e.g. flexible grid), modulation formats, Forward Error Correction (FEC) schemes, and circuit bandwidth. Optical nodes 112 may be produced from one or more vendors and may be configured to support one or more domain configurations. The physical WDM optical substrate layer 104 may also be configured to support one or more virtualized transport networks 106.

The virtualized transport network 106 may be built on top of the physical WDM optical substrate layer 104 and may convert the physical WDM optical substrate layer 104 into a bandwidth pool. The virtualized transport network 106 may also be configured to provide various transport functions, such as virtual private network (VPN). The virtualized transport network 106 may virtualize the physical WDM optical substrate layer 104 by abstracting various optical and electrical resources, constraints, and/or network control and management policies within each of the physical transport networks 102. The virtualized transport network 106 may comprise virtualized nodes 110 that form a topology that may differ from the topology of the physical WDM optical substrate layer 104. The virtualized nodes 110 may be grooming switches, OTN switches, and/or any other network components that transport data between two service sites. The virtualized transport network 106 may use an Open API to provide communication between a centralized controller and one or more VTN applications 108. The VTN applications 108 may be a variety of network applications, such as adaptive bandwidth services, secure cloud services, and self-service provisioning that may be implemented by a client, service provider, and/or other network operators.

Figure 2:
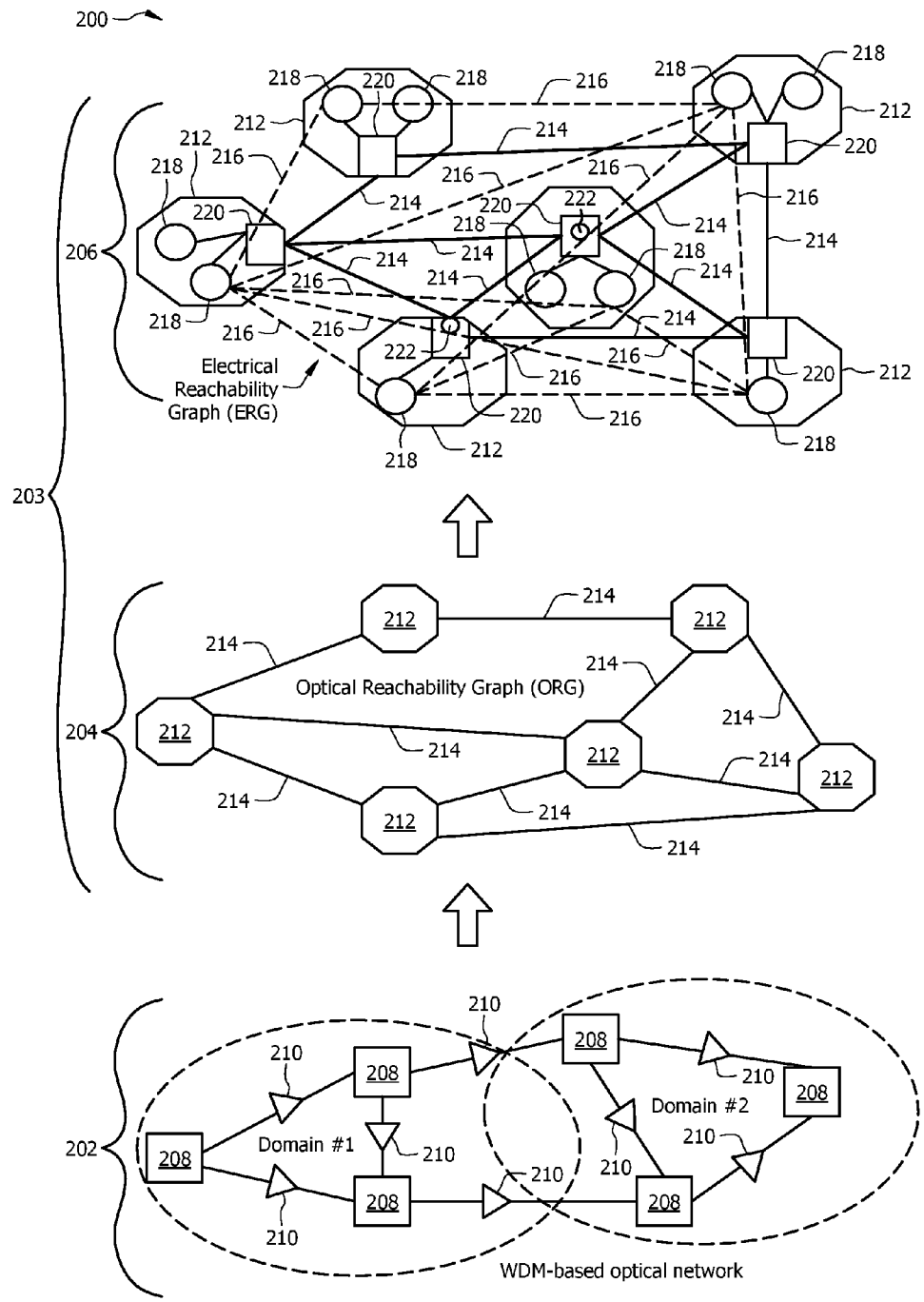
FIG. 2 is a schematic diagram of an embodiment of a transport network that comprises a two-tier virtualized transport network layer.

FIG. 2 is a schematic diagram of an embodiment of a transport network 200 that with a two-tier virtualized transport network layer 203. Specifically, Transport network 200 may comprise a physical WDM optical substrate layer 202 and a two-tier virtualized transport network layer 203. In transport network 200, the physical WDM optical substrate layer 202 may include a WDM-based optical network that comprises optical nodes 208 and optical amplifier nodes 210 that are located within two different domains. The optical nodes 208 (e.g. ROADM) and optical amplifier nodes 210 may be substantially similar to the optical nodes 112 discussed in FIG. 1. Specifically, optical amplifier nodes 210 may be used to amplify optical signals transmitted within the physical WDM optical substrate layer 202. Optical nodes 208 may be used to cross-connect optical signals transmitted within the physical WDM optical substrate layer 202.

The two-tier virtualized transport network layer 203 may have a two-tier framework that comprises an ORG virtualization layer 204 and an ERG virtualization layer 206. The two-tier virtualized transport network layer 203 may hide optical constraints, electrical constraints, and/or bandwidth reconfiguration/migration operations found within the physical WDM optical substrate layer 202. Specifically, the ORG virtualization layer 204 may hide physical fiber topology and specific optical-layer constraints, such as WDM transmission impairments and wavelength-continuity constraints. Furthermore, the ORG virtualization layer 204 may decouple optical impairments and wavelength constraints from RWA algorithms and produce optical transmission capability using various WDM engineering rules. As such, the ORG virtualization layer 204 may produce a consistent end-to-end ORG abstraction that may be useful when the physical WDM optical substrate layer 202 supports different transmission engineering rules. For example, the physical WDM optical substrate layer 202 may be a Carrier network that comprises optical nodes 208 from different vendors and within different domains.

In FIG. 2, the ORG virtualization layer 204 may abstract optical resource information from the physical WDM optical substrate layer 202 to form an ORG. The ORG comprises ORG nodes 212 that are interconnected with optical reachable paths 214. Optical paths between ORG nodes 212 may be evaluated based on a variety of transmission engineering rules that include, but are not limited to fiber characteristics, optical amplifier, dispersion compensation module, WDM engineering rules, and different ROADM structures. Optical paths that satisfy the transmission engineering rules (e.g. the receiver side OSNR should be greater than the back-to-back OSNR requirement) between any two ORG nodes 212 may be classified as an optical reachable path 214.

In addition to transmission engineering rules, other constraints may also be accounted in determining an optical reachable path 214, such as SRLG, wavelength continuity, and network control and management policies. The optical reachable path 214 shown in FIG. 2 may represent an optical path between any two ORG nodes 212 that do not include regenerators within the optical path. Thus, OEO conversion characteristics are typically not be considered when forming the ORG virtualization layer 204. An ORG node 212 may be a service site and/or other type of network element that is able to transport optical data to another ORG node 212 via an optical reachable path 214. The ORG node 212 may be created from abstracting various optical resource information based on the optical nodes 208 (e.g., ROADM) within the physical WDM optical substrate layer 202. The ORG node 212 may represent an abstracted optical service site with various transport functions that include, but are not limited to wavelength multiplexing/demultiplexing functions, cross-connect functions, and long-haul transmission functions.

The ERG virtualization layer 206 may decouple the electrical-layer constraints from bandwidth resource management algorithms. FIG. 2 illustrates that the ERG virtualization layer 206 may be built on top of the ORG virtualization layer 204. The ERG virtualization layer 206 may partition the ORG nodes 212 (e.g. service sites) into one or more ERG nodes 218 (e.g. non-blocking grooming switch) and abstract the grooming and OEO conversion capabilities to form an ERG. As shown in FIG. 2, the ERG virtualization layer 206 partitions ORG nodes 212 into ERG nodes 218, optical switch 220, and regenerator 222. The ERG nodes 218 may be grooming switches, OTN switches, and/or any other network component (e.g. line card) used to facilitate communication between two service sites. The ERG node 218 will be discussed in more detail in FIG. 6. The regenerator 222 may be any device that performs OEO conversion, such as a 3R regenerator. The optical switch 220 may function as a ROADM and/or any other type of optical device that transmits and receives optical data.

The ERG nodes 218 may be interconnected via ERG virtual links 216. The ERG virtual links 216 may represent reachable paths between ERG nodes 218 that include both existing optical channels (OCHs) (e.g. transporting data and lit-up OCHs) and potential OCHs. Potential OCHs may be OCHs that are not transporting data (e.g. non-lit-up OCHs) that may utilize existing regenerators and line cards/transponders inside the network. In contrast to the optical reachable paths 214, the ERG virtual links 216 may be reachable electrical-optical paths with regenerators 222 (e.g. OEO conversion) within the electrical-optical paths. The ERG virtual links 216 may also include reachable electrical-optical paths without regenerators 222. In one embodiment, the ERG virtualization layer 206 may have a full-mesh topology such that the ERG virtualization layer 206 may provide any-to-any service connectivity between ERG nodes 218 that is potentially a single-hop in the electrical domain, and thereby improve quality of service (QoS) assurance. In another embodiment, the ERG virtualization layer 206 may have the same topology as the ORG if there are no regenerators 222 configured in the physical WDM optical substrate layer 202. The ERG virtual links 216 will be discussed in more detail in FIG. 7.

The two-tier virtualized transport network layer 203 may provide several benefits to optical network design, control, and management. The virtualization of optical-layer and electrical-layer resource (e.g. wavelengths, 3R pool, and transponder bank) may be represented as layered graph models that logically separate optical and electrical layer functions and supports transport functions virtualization between packet, OTN, and physical WDM transport technologies. New services and software algorithms (e.g. new supporting features) may be deployed without relying on a particular physical optical substrate (e.g. without binding to particular optical network hardware and topology). As a result, service providers may gain optical programmability, automation, and network control to build highly scalable and flexible virtual networks. Furthermore, the two-tier virtualized transport network layer 203 may simplify the network control and management process that provides flexible bandwidth service provisioning and scalable virtual transport network solutions within a vender heterogonous-optical networking environment.

The two-tier virtualized transport network layer 203 may be managed by a centralized controller, such as a PCE controller and/or an OF-based software controller. The centralized controller may comprise two different middleware modules to translate and map the virtualization across topological layers. The ORG middleware module may primarily focus on producing the ORG for the ORG virtualization layer 204. The ORG middleware module may form the ORG virtualization layer 204 by converting the physical WDM optical substrate layer 202 into a transmission-capability-aware logical topology. To create the transmission-capability-aware logical topology, the centralized controller may abstract resource information for optical nodes 208 and optical amplifier nodes 210 (e.g. physical WDM transmission resources) and determine (e.g. measure) the optical hardware transmission limits, such as optical power, OSNR, dispersion, and non-linear transmission effects, from a network-level viewpoint. The ORG middleware module may also decouple the ORG virtualization layer 204 from one or more optical constraints, such as transmission impairments and wavelength-continuity constraints. SRLG and wavelength usage information can also be maintained within the ORG middleware module to prevent the RWA algorithms from interacting with vendor-specific physical fiber data structures.

The ERG middleware module within the centralized controller may form the ERG virtualization layer 206 by extracting the networking capability of regenerators 222 that perform OEO conversion and the grooming functional capability of virtual nodes (e.g. OTN switch/Ethernet switch) to form an electrical-optical channel logical topology. The ERG virtualization layer 206 may be a virtualized optical network view that illustrates the cross-connects and wavelengths managed in physical WDM optical substrate layer 202. Depending on the regenerators' (e.g. 3R regenerators) configuration and the ORG, the ERG virtualization layer 206 may determine whether two ERG nodes 218 (e.g. a grooming node) are reachable without the need of intermediate ERG nodes 218. For example, if the regenerators 222 are already configured along the shortest path between the two ERG nodes 218, then the two ERG nodes 18 are reachable without the need of intermediate grooming functions. The ERG middleware module may also partition the ORG nodes 212 (e.g. service site) into a plurality of ERG nodes 218, allowing service providers to evaluate electrical reachability between any ERG nodes 218. Partitioning the ORG nodes 212 may be used to design a more efficient virtual network with embedded mapping algorithms when treating the electrical grooming capacity as a node constraint. For both ORG and ERG, the paths between nodes can be weighted by different polices such as the total number of reachable paths or the total number of OEO transverses and may be programmable to satisfy various Carrier preferences. The centralization control node will be discussed in more detail below.

Figure 3:
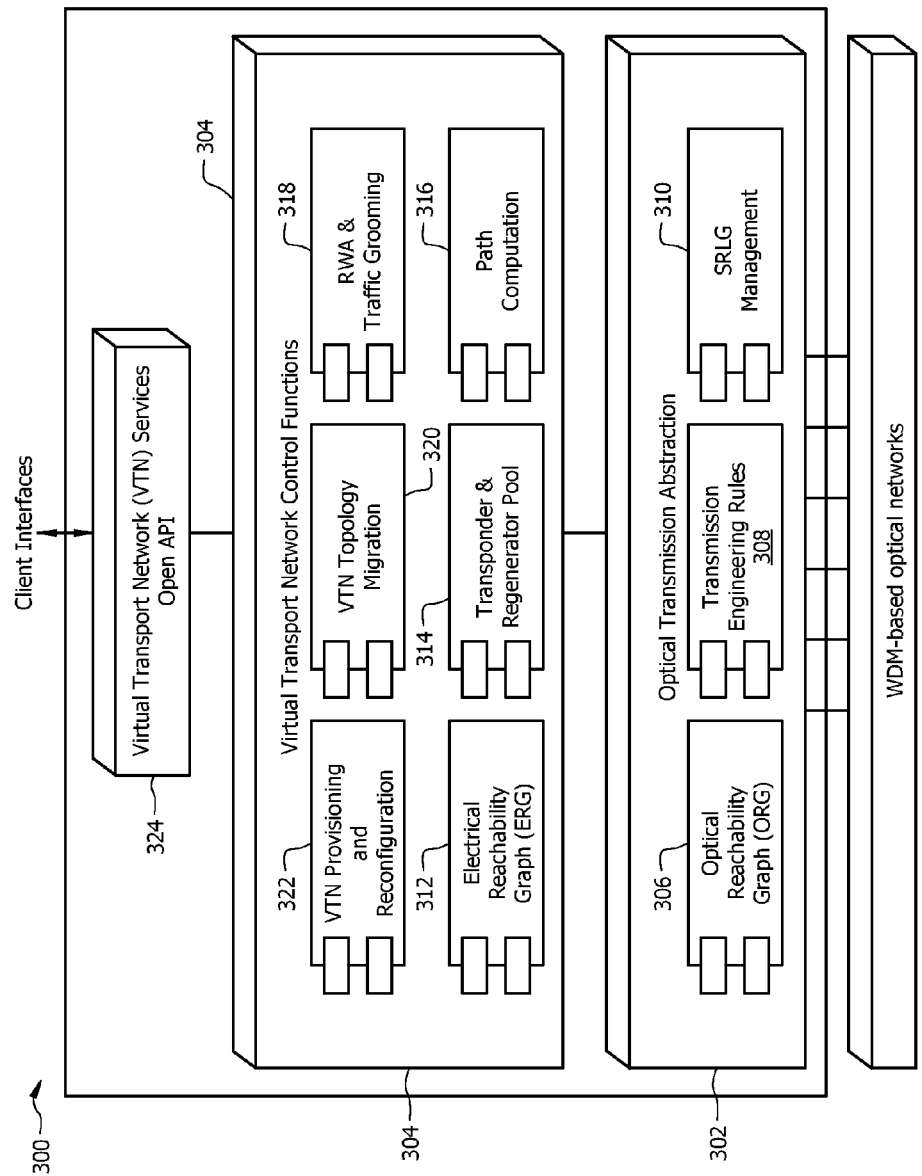
FIG. 3 is a schematic diagram of an embodiment of a centralized controller that manages network topology abstractions across both optical and electrical layers.

FIG. 3 is a schematic diagram of an embodiment of a centralized controller 300 that manages transport network functions virtualization across both optical and electrical layers. The centralized controller 300 may be a PCE, an OF-based software controller, a server, network management system, and/or any other logically/physically centralized node configured to manage the control plane (e.g. SDN controller). The centralized controller 300 may produce an ORG and an ERG that both conceal the underlying physical WDM optical substrate layer (e.g. the physical transport network) and decouples the optical transport network independent of specific vendor equipment and specific applications. As such, various bandwidth applications (e.g., connection transport) may operate on an abstraction of the optical transport network and leverage transport services and optical transmission capabilities without being tied to the details of physical implementation. As shown in FIG. 3, the centralized controller 300 may also interface (e.g. southbound interface) with one or more of the optical transport hardware nodes, which are substantially similar to the optical nodes 112 in FIG. 1.

The centralized controller 300 may comprise the ORG middleware module 302 and the ERG middleware module 304. The ORG middleware module 302 may be configured to perform the optical transmission abstraction and may comprise the ORG module 306, the transmission engineering rules module 308, and the SRLG management module 310. The transmission engineering rules module 308 may be configured to store and/or maintain a set of transmission engineering rules that include WDM engineering rules, different constraints from the optical devices (e.g. ROADM structures), and equipment parameters (e.g. parameters for different types of transponders). Moreover, the transmission engineering rules module 308 may store and/or maintain different domain management policies and network control policies for the physical WDM optical substrate layer. The SRLG management module 310 may store and maintain SRLGs, and may perform path optimization using SRLGs. The SRLG management module 310 may be configured for SRLG association management to determine diverse routing paths. SRLGs refer to where the links in the physical WDM optical substrate layer share a common fiber and/or a common physical attribute. If one link fails, other links in the group may fail too. As such, the links in a SRLG group may have a shared risk.

The ORG module 306 may calculate some or all of the reachable optical paths without any regenerators and/or other OEO conversion nodes within the reachable optical paths. The ORG module 306 may calculate the reachable optical paths for each node using a variety of path computing algorithms, such as K-shortest path (KSP) algorithms and/or depth-first-search (DFS) algorithms. The ORG module 306 may subsequently verify the quality of transmission (QoT) of each reachable optical path by using fiber propagation simulations or experimental approaches well-known in the art. The ORG module 306 may also verify the QoT while considering the co-transmission impact on existing, reachable optical paths. The ORG module 306 may construct an ORG graph that depicts a connected graph among all node pairs. Each ORG node in the ORG graph may be associated with one or multiple physical fiber routes that represent a potential optical path indication according to an RWA algorithm.

The ERG middleware module 304 may be configured to provide VTN control and management and may partition physical transport resources into multiple VTNs. The ERG middleware module 304 may comprise an ERG module 312, a transponder regenerator pool module 314, a path computation module 316, a RWA and traffic grooming module 318, a VTN topology migration module 320, and a VTN provision and reconfiguration module 322. The ERG module 312 may be configured to design and/or redesign the virtual electrical topology based on the aggregated and/or groomed traffic from virtual machines (VMs), IP routers, Multiprotocol Label Switching (MPLS)-Transport Profile (TP)/Ethernet/OTN switches, and other types of network nodes that operate in the electrical domain. The ERG module 312 may produce a set of optical channel transport unit-k (OTUk) and/or OCHs between each virtual ORG node pair (e.g. a pair of electrical grooming switches) within the ERG. In one embodiment, the ERG may have ERG nodes that indicate whether two ERG nodes are electrical-layer reachable and may pass through ERG virtual links with an available optical channel data unit-k (ODUk) resource without the need of intermediate grooming.

The transponder and regenerator pool module 314 may be responsible for transponder/OEO resource dimensioning, sharing, and migration (e.g. centralization) that may affect the ERG. The path computation module 316, RWA and traffic grooming module 318, VTN topology migration module 320, and VTN provision and reconfiguration module 322 may be used for optimizing network performance for traffic engineering and network engineering issues. Specifically, the path computation module 316 may be configured to optimize route traffic flows through existing optical paths from the ORG and/or additional paths created in the ERG. The VTN provision and reconfiguration module 322 may be used to trigger and perform a reconfiguration process of virtual electrical topology under situations, such as fiber cut as well as traffic variation. The RWA and traffic grooming module 318 may be used to assign network resources that include wavelengths, regenerators, and grooming resources to various VTNs. The VTN topology migration module 320 may be configured to rearrange existing OCH bandwidth resources via one or more migration mechanisms to optimize the usage of network resources.

FIG. 3 also illustrates that a VTN services Open API 324 may be used to communicate with VTN applications, client interface, and/or other higher-layer controllers. The VTN services Open API 324 may provide a flexible method for higher-layer controllers to control their own virtual network partition for on-demand resource allocation, self-service provisioning, and secure cloud services. As a result, the facilitation of communication via the VTN services Open API 324 may increase the transport network control and management scalability and services agility. Table 1 provides Open API definitions that may be used for node mapping, link mapping, VTN provisioning, updating the ORG and updating the ERG.

TABLE 1

| Open API function | Open API definition/coding |
| --- | --- |
| Node Mapping | extern "C" _declspec(dllexport) int NodeMapping(int Node, int nodeType); |
| Link Mapping | extern "C" _declspec(dllexport) int LinkMapping(int NodeA, int NodeB, int Linktype); |
| VTN provisioning | extern "C" _declspec(dllexport) int VTNProvisioning(int VTNtype, std::vector<int> Node, std::vector<int> Link); |

TABLE 1-continued

| Open API function | Open API definition/coding |
| --- | --- |
| Update ORG | extern "C" _declspec(dllexport) int UpdateORG (std::vector<int> omsVector, int updateType); |
| Update ERG | extern "C" _declspec(dllexport) int UpdateERG (std::vector<int> ochVector, int updateType); |

Figure 4:
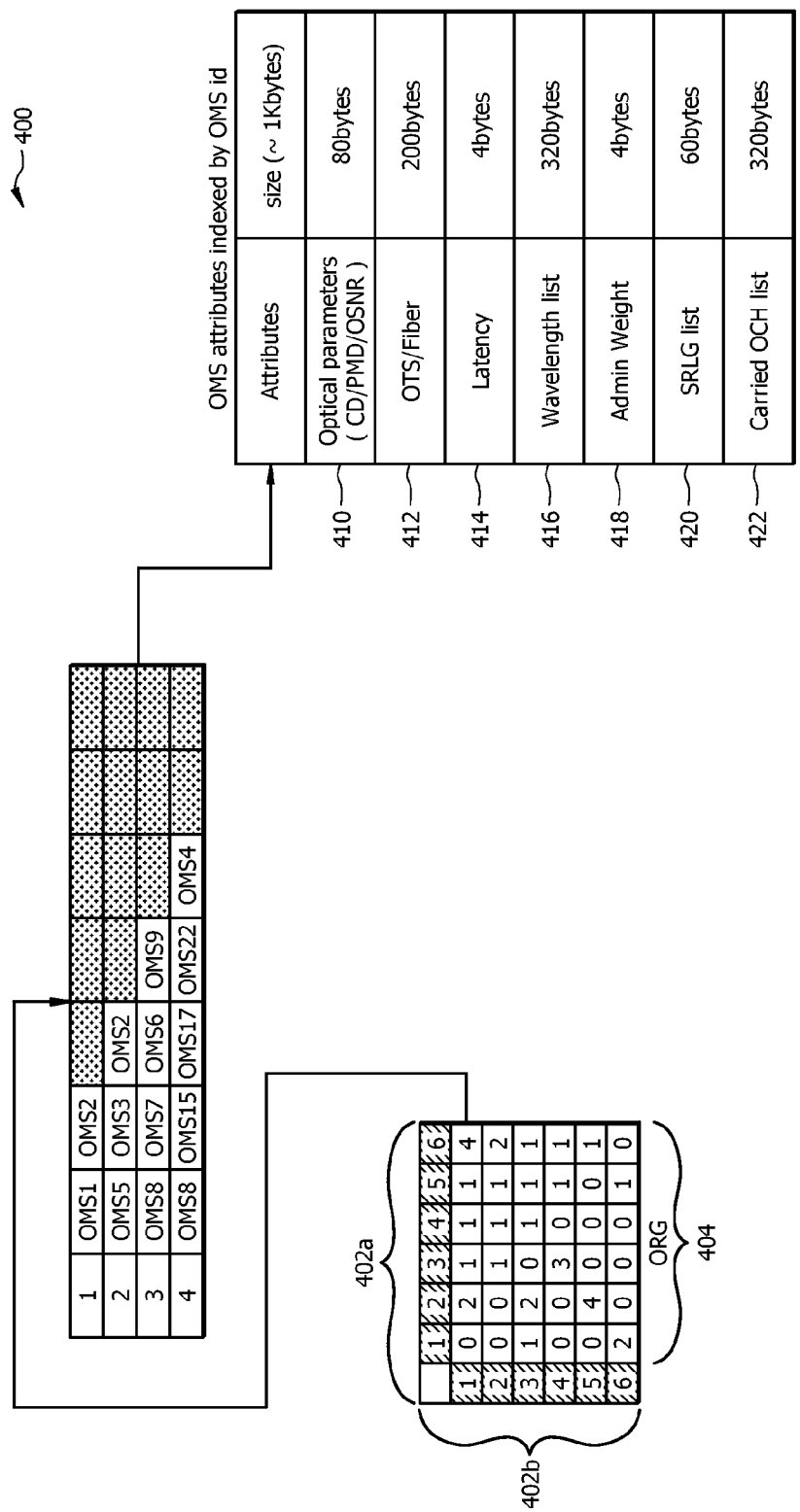
FIG. 4 is a schematic diagram of an embodiment of an ORG data model.

FIG. 4 is a schematic diagram of an embodiment of an ORG data model 400. The ORG data model 400 may be a map, table, list, and/or vector that represents the ORG topology. In one embodiment, the ORG data model 400 may be in a linked list data structure for quicker information retrieval. In the case of a transport network with 100 ROADM nodes and 1000 OMS links, a memory size of about three megabytes or less may be used to store the ORG. FIG. 4 illustrates that the ORG data model 400 may be arranged as a table that comprises a first row (e.g. top most row) and a first column (e.g. left most column). The first row (e.g. 1-6) and first column (e.g. 1-6) may represent ORG node identifiers (IDs) 402a and 402b (e.g. ROADM IDs). For example, the number "1" in the first row may represent the ORG node with an ORG node ID 402a "1" of one, while number "2" in the first row may represent ORG node with an ORG node ID 402a "2." FIG. 4 also illustrates that the first column comprises a number "1" that may also identify the ORG node ID 402b "1."

ORG numbers 404 represent the number of OMS physical routes between each ORG node pair. Using FIG. 4 as an example, four different OMS physical routes exist between ORG nodes with ORG node ID 402a of six and ORG node ID 402b of one. ORG numbers 404 with a value of zero indicate that there are no optical reachable paths between the ORG nodes identified by the ORG node IDs 402a and 402b. ORG numbers 404 with a value of one or more indicate that there is at least one optical reachable path between the ORG nodes identified by the ORG node IDs 402a and 402b.

The OMS physical route table 406 may indicate the OMS routes between two ORG nodes identified by ORG node IDs 402a and 402b. The OMS physical route table 406 comprises a first column 405 (e.g. left-most side of the OMS physical route table 406) that indicates the OMS physical route IDs. The remaining columns within the OMS physical route table 406 may indicate the OMS link IDs 408 used to form the OMS physical route. For example, the first column 405 includes numbers 1-4. Number "1" represents the OMS physical route ID and the numbers afterward within the same row represent the OMS link IDs 408 used to form the OMS physical route "1" between ORG node ID 402a of six and ORG node ID 402b of one. As shown in FIG. 4, OMS physical route "1" is constructed using OMS links identified by OMS link ID 408 "1" and OMS link ID 408 "2." OMS physical route "2" is constructed using OMS links identified by OMS link ID 408 "5," OMS link ID 408 "3," and OMS link ID 408 "2."

The OMS attributes may be indexed by the OMS link ID 408 and may include optical transmission parameters 410, Optical Transport Section (OTS)/Fiber spans 412, transmission latency 414, wavelength list 416, administration weight 418, SRLG list 420, and carried OCH list 422. The optical transmission parameters 410 may represent physical fiber transmission attributes, such as polarization mode dispersion (PMD), chromatic dispersion (CD), and OSNR for the OMS link and may be about 80 bytes long. The OTS/Fiber spans 412 may represent the different types of optical media and fibers within the OMS link and be about 200 bytes long.

Transmission latency 414 may represent the latency or time delay for the OMS link and may be about four bytes long. The wavelength list 416 may represent the set of wavelengths used to transport optical signals and may be about 320 bytes long. The administration weight 418 may represent the weight and/or cost associated with the OMS link, which may be specified by network providers, and may be about four bytes long. The SRLG list 420 may represent the SRLGs within the OMS link and may be about 60 bytes long. The Carried OCH list 422 may represent the OCHs that currently carry traffic using this OMS link and may be about 320 bytes long.

Figure 5:
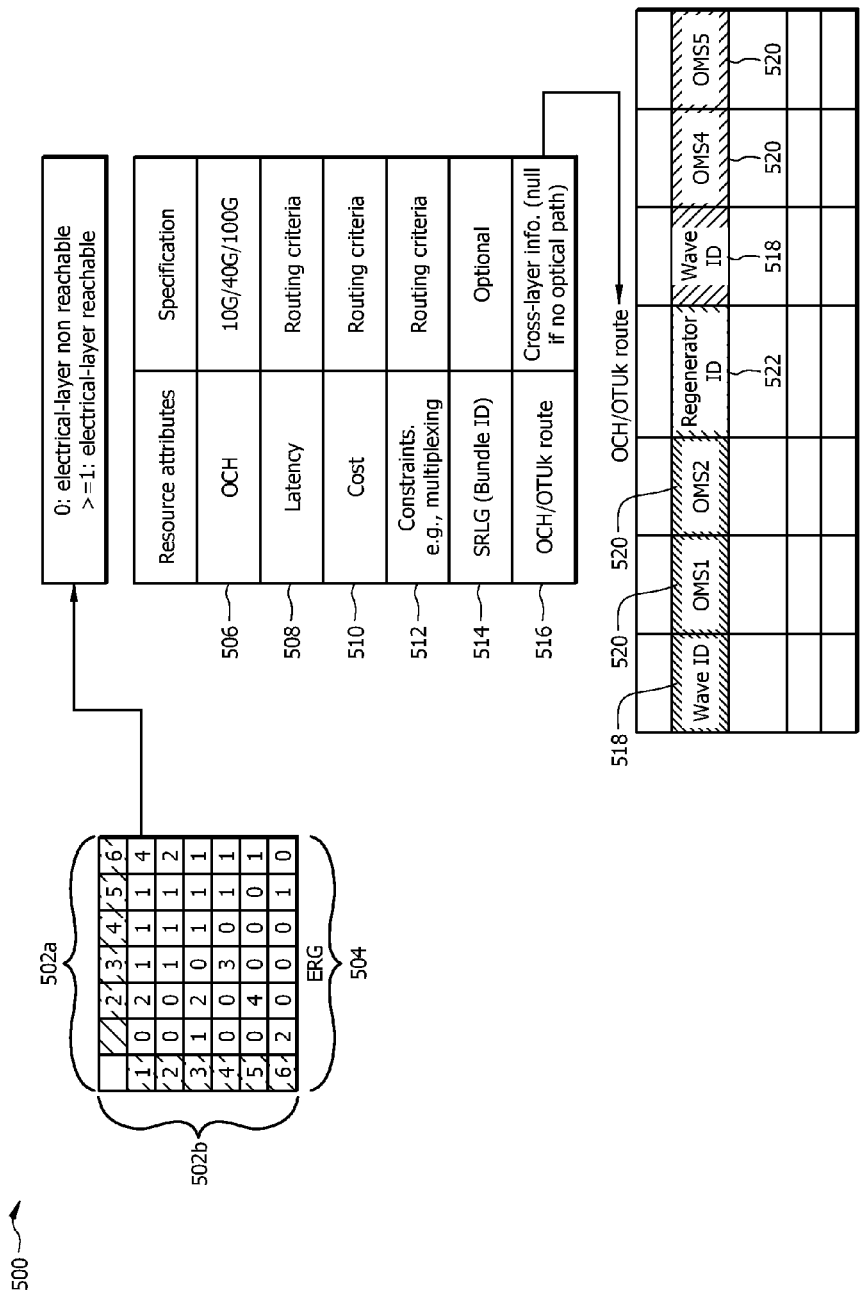
FIG. 5 is a schematic diagram of an embodiment of an ERG data model.

FIG. 5 is a schematic diagram of an embodiment of an ERG data model 500. The ERG data model 500 may be manually created by a network operator (e.g. a Carrier) and/or automatically created by the central controller node based on the ORG and OEO conversion and grooming capability information abstracted from the physical WDM optical substrate layer. Similar to the ORG data model 400 discussed in FIG. 4, the ERG data model 500 may be a map, table, list, and/or vector that represents the ORG topology. In one embodiment, the ERG data model 500 organizes the networking resources, such as wavelength, OMS link, transponder, regenerators, line cards, OCH, and ODUk, are organized into a high scalable linked list for quicker information retrieval. As such, the ERG data model 500 may be used to form an electrical-optical channel bandwidth pipe graph (e.g. bandwidth cloud).

FIG. 5 illustrates that the ERG data model 500 may be arranged as a table that comprises a first row (e.g. top most row) and a first column (e.g. left most column). The first row (e.g. 1-6) and first column (e.g. 1-6) may represent ERG node IDs 502a and 502b (e.g. grooming switch IDs). For example, the number "1" in the first row may represent the ERG node with an ERG node ID 502a of one, while number "2" in the first row may represent ERG node with an ERG node ID 502a of two. FIG. 5 also illustrates that the first column comprises a number "3" that may also identify the ERG node ID 502b of three.

ERG numbers 504 may represent the number of electrical-layer reachable routes between each ERG node pair. Using FIG. 5 as an example, four electrical-layer reachable routes exist between ERG node with ERG node ID 502a of six and ERG node ID 502b of one. ERG numbers 504 with a value of zero indicate that there are no electrical reachable paths between the ERG nodes identified by the ERG node IDs 502a and 502b. ERG numbers 504 with a value of one or more indicate that there is at least one optical reachable path between the ERG nodes identified by the ERG node IDs 502a and 502b.

Each of the electrical-layer reachable routes may comprise a plurality of resource attributes that may include OCH type 506, transport latency 508, transport cost 510, constraints 512, SRLG 514, and OCH/OTUk route 516. The OCH type 506 may represent the data rate specification, such as 10 gigabit (G), 40 G, and 100 G. Transport latency 508 may represent routing criteria for the latency or time delay for the OCH/OTUk route 516. Cost 518 may represent routing criteria for the weight and/or cost associated with the OCH/OTUk route 516, which may be specified by network providers. Constraints 512 may represent mapping/switching limitations and other equipment constraints associated with the OCH/OTUk route 516. The SRLG 514 may represent the SRLGs within the OMS link. The OCH/OTUk route 516 may represent the OMS route with additional regenerators between the two ERG nodes. The OCH/OTUk route 516 may comprise wave IDs 518, OMS link IDs 520, and regenerator IDs 522. The wave IDs 518 may identify the wavelengths used by the OCH/OTUk route 516. The OMS link IDs 520 may identify the OMS links within the OCH/OTUk route 516. The regenerator ID 522 may identify the regenerator within the OCH/OTUk route 516.

Figure 6:
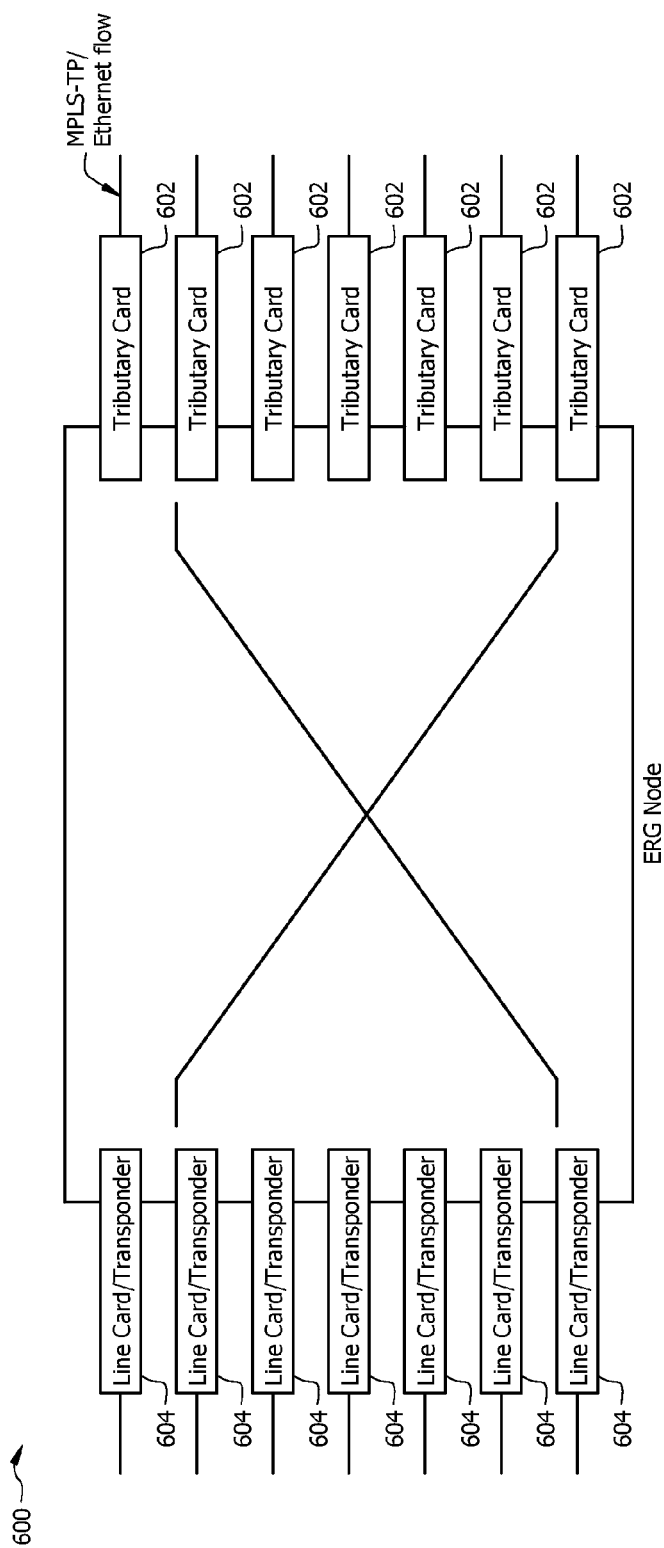
FIG. 6 is a schematic diagram of an embodiment of an ERG node configured to perform grooming functions.

FIG. 6 is a schematic diagram of an embodiment of an ERG node 600 configured to perform grooming functions. The ERG node 600 may be represented as a common switch model that includes an OTN switch, Synchronous Optical Network (SONET)/Synchronous Digital Hierarchy (SDH) switch, Ethernet switch, MPLS-TP switch, and/or any other type of transport switch. In one embodiment, the ERG node 600 may be a non-blocking transport switch that switches or cross connects input interfaces (e.g. input port) to an output interface (e.g. output port) if both the input interface and output interface are free to transport data. In another embodiment, ERG node 600 may be a blocking transport switch that cross connects input interfaces and output interfaces when at least one of the interfaces is not free to transport data. As shown in FIG. 6, the ERG node 600 may comprise tributary cards 602 to receive input signals (e.g. data from MPLS-TP and/or Ethernet flow) and output the received signals as optical signals via the line cards/transponders 604.

Figure 7:
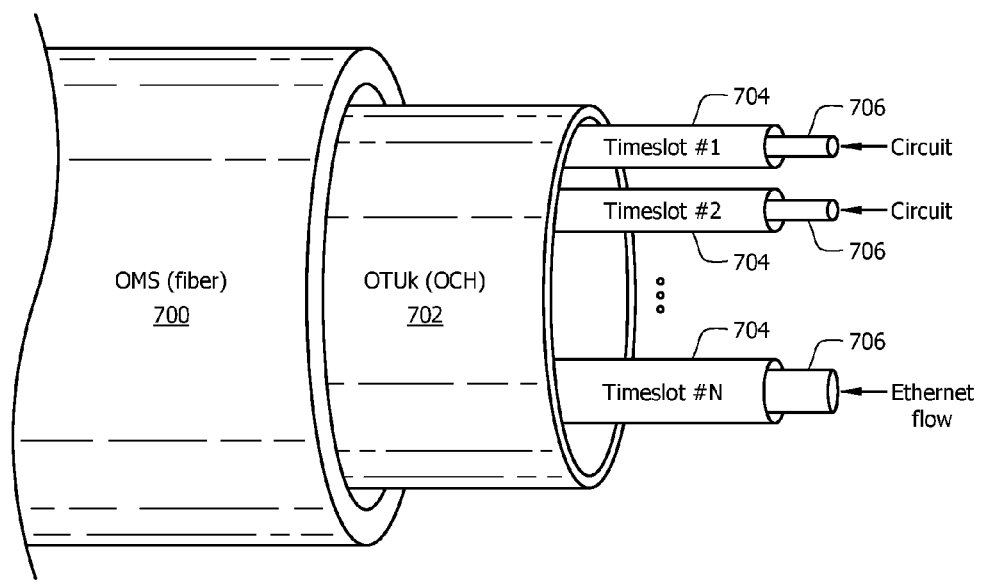
FIG. 7 is a schematic diagram of an embodiment of an optical multiplex section (OMS) link.

FIG. 7 is a schematic diagram of an embodiment of an OMS (e.g. fiber) link 700. OMS link 700 may be represented as a virtualized link model that includes MPLS-TP link, pseudowire (PW) tunnel, ODUk trail, OCH, OMS, fiber cable, and other types of links. FIG. 7 illustrates that the OMS link 700 may comprise one or multiple OTUk/OCH(s) 702 to transport optical signals. The OTUk/OCH 702 is subdivided into a plurality of timeslots 704. Each of the timeslots 704 may represent a portion of the optical signal. The timeslots 704 may be further subdivided into different traffic flows 706 and/or data from a particular circuit 706.

Figure 8:
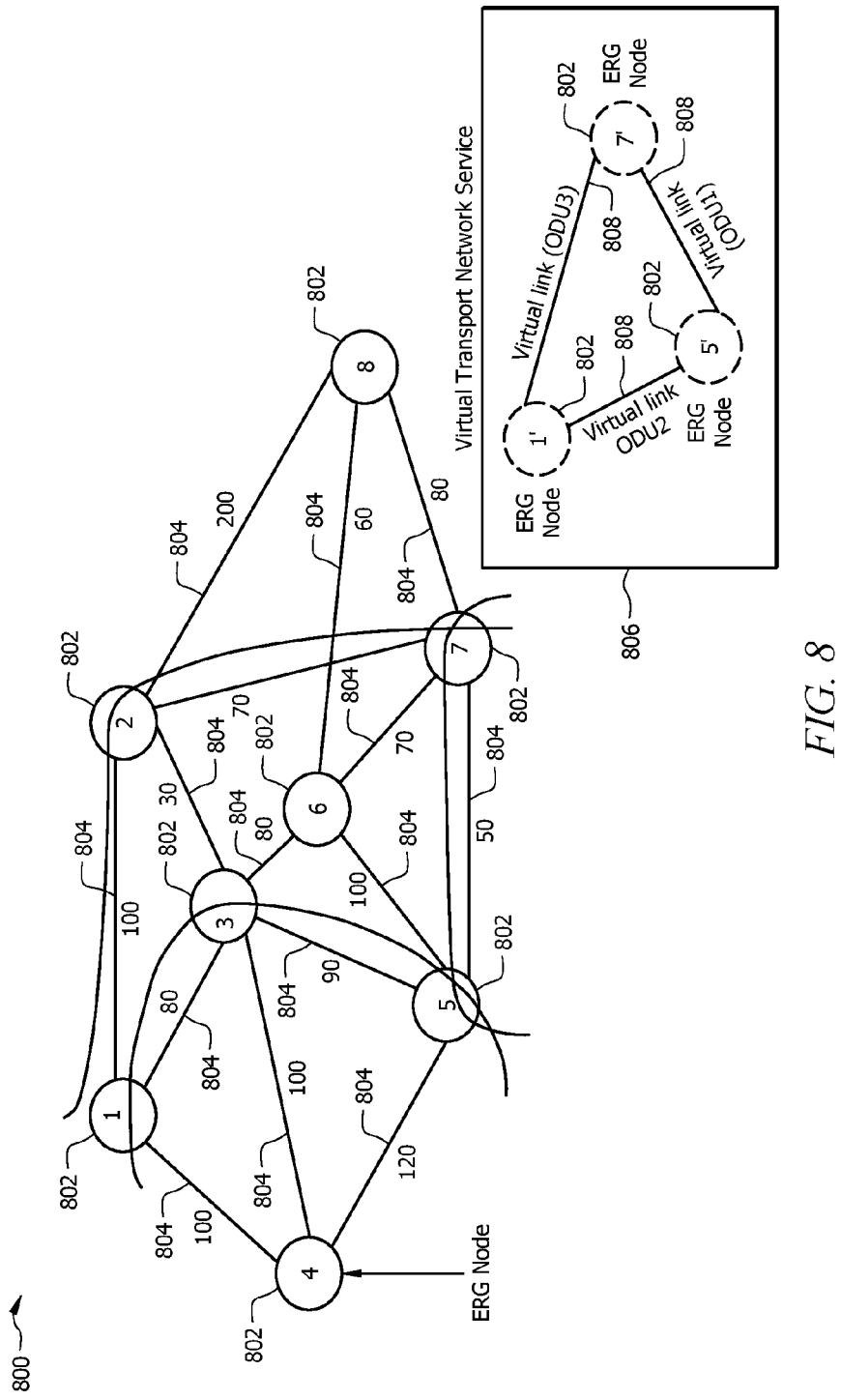
FIG. 8 is a schematic diagram of an embodiment of provisioning a virtual transport networks (VTN) service over an ERG.

FIG. 8 is a schematic diagram of an embodiment of provisioning a VTN service 806 over an ERG 800. The ERG 800 comprises ERG nodes 802 that are interconnected with ERG virtual links 804. FIG. 8 depicts numbers next to the ERG virtual links 804 that represent a weight and/or cost associated with the ERG virtual links 804. For example, the ERG virtual link 804 that connects ERG node 4 802 with ERG node 1 802 has a weight value of 100. The weight and/or cost associated with the ERG virtual links 804 may reflect the cost for creating an OCH that includes, but are not limited to, optical nodes, regenerators, and/or transponders.

The VTN service 806 is provisioned over the ERG topology with the objective to minimize the total network cost. The virtual link provisioning solution may be derived from a least-cost-first algorithm to place line cards (e.g. grooming capacity to create OCHs) along the ERG virtual links 804 (e.g. electrical reachable paths) while considering the ERG node 802 constraints such as the ODUk mapping limitation and cross-connect granularity. The process to reduce the total cost of OCHs may be based on approximation algorithms of integer linear programming (ILP) or meta-heuristic algorithms such as tabu-search or simulated annealing.

FIG. 8 illustrates that a VTN service 806 may be provisioned between ERG nodes 1, 5, and 7 802 via virtual service links 808. The virtual service link 808 between ERG nodes 1 and 5 802 may comprise the ERG virtual link 804 between ERG nodes 1 and 3 802 and the ERG virtual link 804 between ERG nodes 3 and 5 802. The virtual service link 808 between ERG nodes 1 and 7 802 may comprise the ERG virtual link 804 between ERG nodes 1 and 2 802 and the ERG virtual link 804 between ERG nodes 2 and 7 802.

The virtual service link 808 between ERG nodes 5 and 7 802 may comprise the ERG virtual link 804 between ERG nodes 5 and 7 802.

Figure 9:
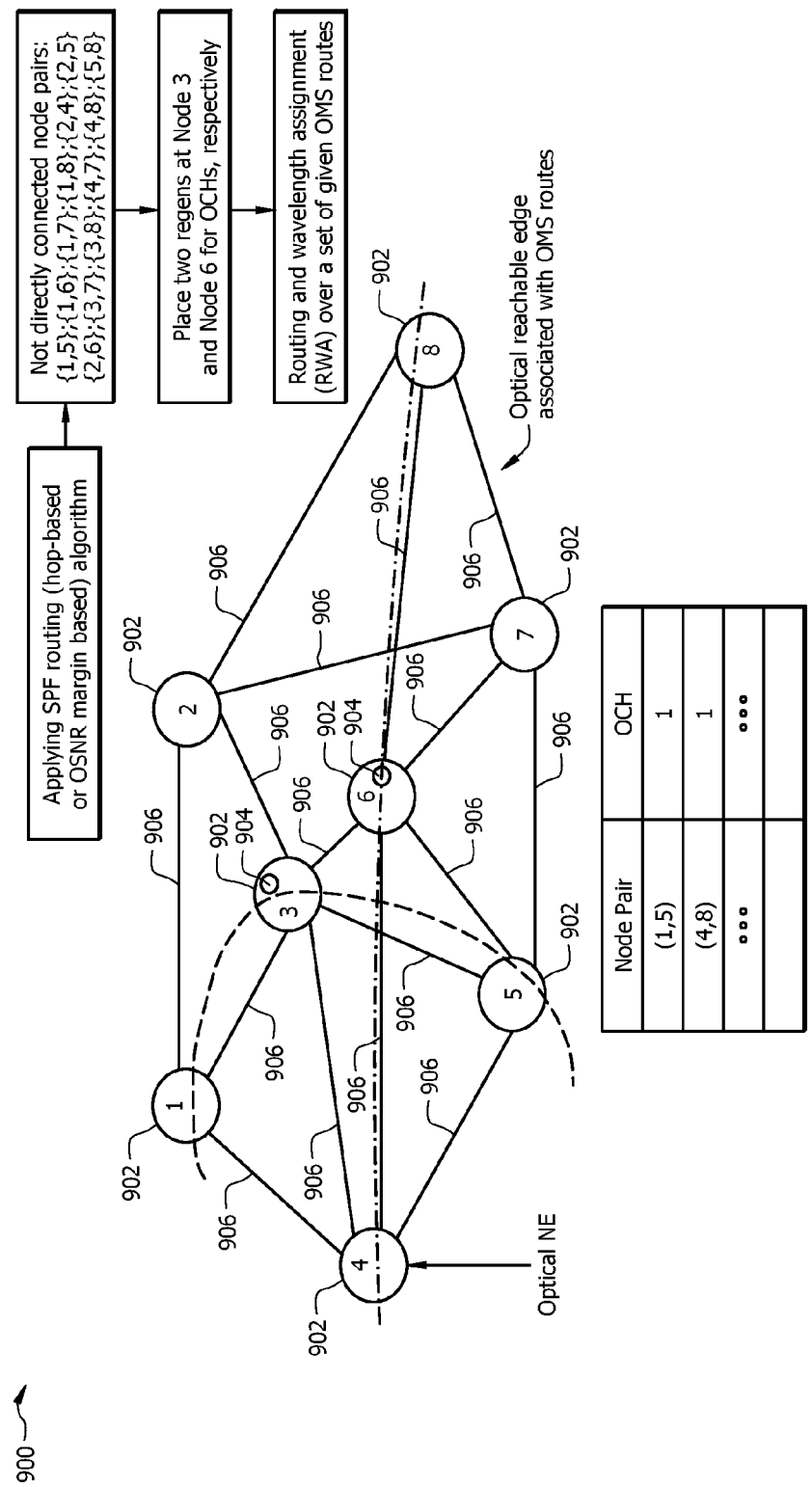
FIG. 9 is a schematic diagram of an embodiment of placing additional regenerators using the ORG.

FIG. 9 is a schematic diagram of an embodiment of placing additional regenerators 904 using the ORG 900. The ORG 900 comprises ORG nodes 902, optical reachable paths 906, and regenerators 904. A regenerator placement algorithm may be implemented over the ORG 900 instead of using the topology of the physical WDM optical substrate layer. Within the regenerator placement algorithm, a shortest-path-first (SPF) algorithm may determine a minimum number of regenerators along the optical reachable paths 906 over the ORG 900. Different customized polices such as load-balancing and regenerator centralization can also be considered within the regenerator placement algorithm. Afterwards, the optical reachable path 906 may be mapped onto the physical fiber route and may consider SRLG constraints as necessary. Corresponding wavelengths may be assigned for the physical fiber route by using an algorithm, such as first-fit algorithm.

FIG. 9 illustrates that an SPF routing algorithm may be applied to determine ORG node pairs that are not directly connected with each. In other words, one or more ORG nodes 902 are located in between the ORG node pair. ORG 900 are ORG node 1 902 and ORG node 5 902 ({1, 5}), ORG node 1 902 and ORG node 6 902 ({1, 6}), ORG node 1 902 and ORG node 7 902 ({1, 7}), ORG node 1 902 and ORG node 8 902 ({1, 8}), ORG node 2 902 and ORG node 4 902 ({2, 4}), ORG node 2 902 and ORG node 5 902 ({2, 5}), ORG node 2 902 and ORG node 6 902 ({2, 6}), ORG node 3 902 and ORG node 7 902 ({3, 7}), ORG node 3 902 and ORG node 8 902 ({3, 8}), ORG node 4 902 and ORG node 7 902 ({4, 7}), ORG node 4 902 and ORG node 8 902 ({4, 8}), and ORG node 5 902 and ORG node 8 902 ({5, 8}). At least two regenerators 904 may be placed at ORG nodes 3 902 and 6 902 to provide full electrical reachability for each node pair.

In another embodiment, the ORG and ERG may be combined together to determine placement of additional regenerator and grooming resources. The central controller node may be configured to group traffic flows based on different priorities and bandwidth granularities for each ERG node pair. A path computation module (e.g. path computation module 316 described in FIG. 3) may initially determine a route over the ERG, and if the service routing module is unable to find a route, an electrical reachable path may be created over the ORG. Afterwards, an RWA algorithm may be implemented to assign wavelengths to the fiber route, a regenerator placement may be performed as described in FIG. 9, and the ERG may be updated, accordingly. Different polices such as load-balancing, diversity routing, and bandwidth admission control can also be taken into account to optimize the resource utilization. For example, for a small-granularity traffic flow (e.g. the bandwidth is not greater than about 80% of OCH), a better option may be to add more grooming resources (e.g. line cards and switching fabric) rather than to place regenerators in the middle since the grooming resource can be easily shared among different ERG node pair traffic flows. However, when the service flow is larger (e.g. greater than 80% of OCH), regenerators may be added in the middle because grooming resources typically are more expensive than the regenerators. The process may be iterative using optimization techniques to optimize network performance (e.g. minimal number of wavelengths or total number of line cards, transponder/muxponders, and regenerators).

Figure 10:
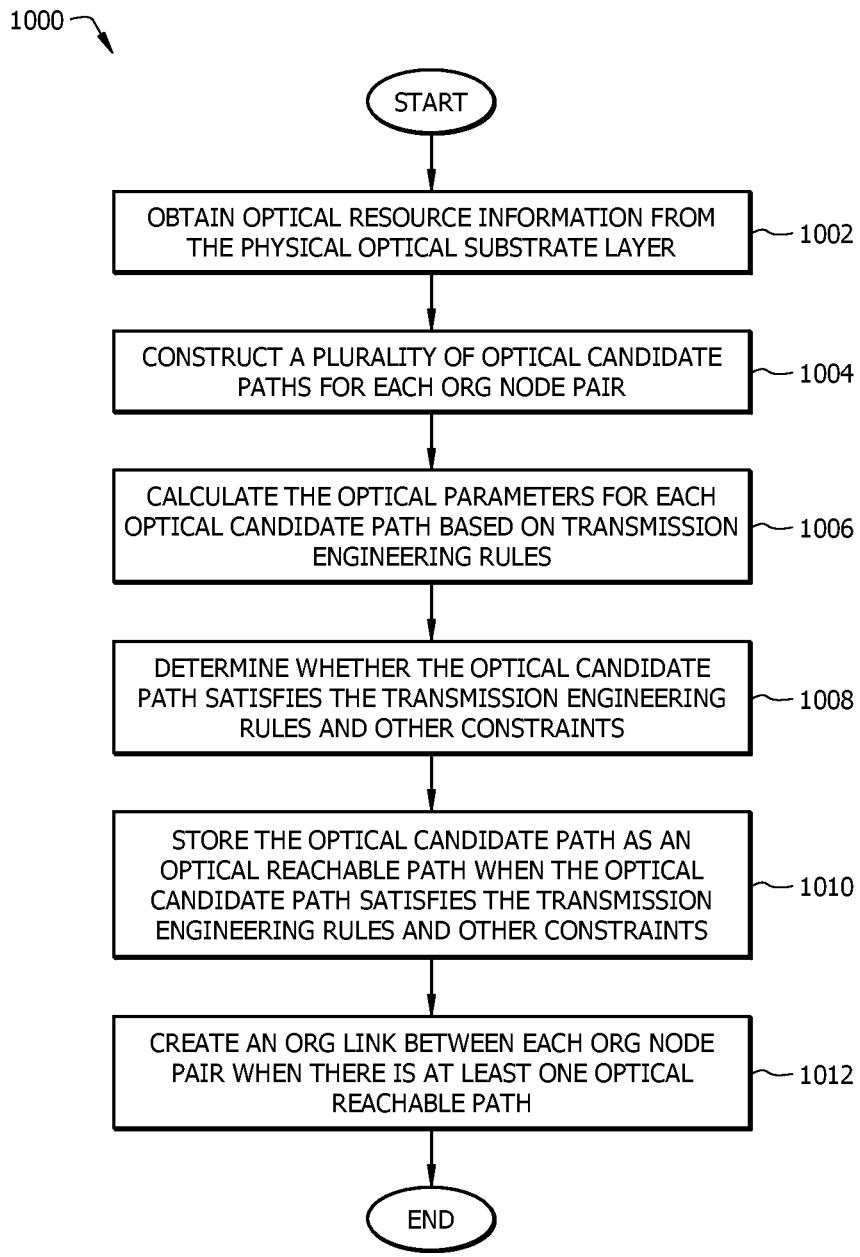
FIG. 10 is a flowchart of an embodiment of a method used to construct an ORG.

FIG. 10 is a flowchart of an embodiment of a method 1000 used to construct an ORG. Method 1000 may be implemented by a centralized controller node. In one embodiment, method 1000 may be implemented within the ORG middleware module 302 discussed in FIG. 3. Method 1000 may start at block 1002 and obtain optical resource information from the physical WDM optical substrate layer. The optical resource information may include optical hardware transmission limits, such as optical power, OSNR, dispersion, and non-linear transmission effects. The optical resource information may also include SRLG and network control and management policies. Method 1000 may then move to block 1004 to construct a plurality of optical candidate paths for each ORG node pair. Recall the optical candidate paths may be obtained using a variety of path computation algorithms, such as a K shortest path algorithm and/or a depth-first-search algorithm.

Method 1000 may move to block 1006 and calculate the optical parameters for each optical candidate path based on transmission engineering rules. The optical parameters may be used to verify the QoT of each optical candidate path using fiber propagation simulations or experimental approaches that are well-known in the art. Method 1000 may then proceed to block 1008 and determine whether the optical candidate path satisfies the transmission engineering rules and other constraints. Other constraints may include, but are not limited to, SRLG, wavelength continuity, and domain management policies. Afterwards, method 1000 may continue to block 1010 and store the optical candidate path as an optical reachable path when the optical candidate path satisfies the transmission engineering rules and other constraints. In other words, method 1000 may classify the optical candidate path as an optical reachable path when the optical candidate path satisfies the transmission engineering rules and other constraints. In one embodiment, method 1000 may store the optical reachable paths within the centralized controller node. Method 1000 may continue to block 1012 and create an ORG link between each ORG node pair when there is at least one optical reachable path for the ORG node pairs. The creation of the ORG links will determine the ORG topology.

Figure 11:
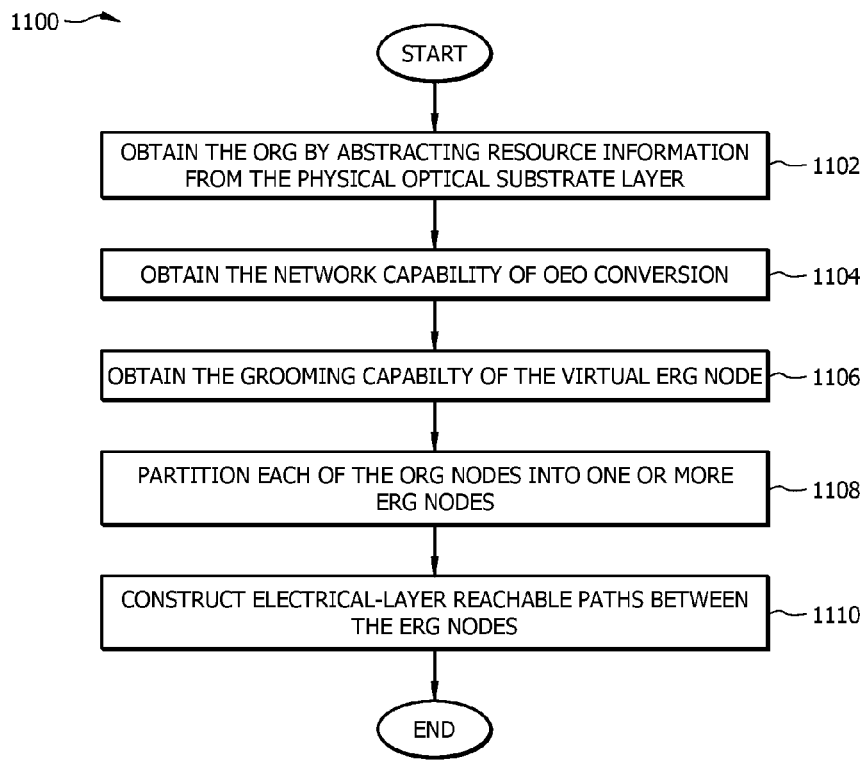
FIG. 11 is a flowchart of an embodiment of a method used to construct an ERG.

FIG. 11 is a flowchart of an embodiment of a method 1100 used to construct an ERG. Method 1100 may be implemented by a centralized controller node. In one embodiment, method 1100 may be implemented within the ERG middleware module 304 discussed in FIG. 3. Method 1100 starts at block 1102 and obtains the ORG by abstracting resource information from the physical WDM optical substrate layer. The ORG may be constructed using method 1000 in FIG. 10. Method 1100 may then move to block 1104 and obtain the network capability of OEO conversion. As discussed above, the OEO conversion may be performed by regenerators. Method 1100 may then continue to block 1106 and obtain the grooming capability of the ERG node. Afterwards, method 1100 may move to block 1108 and partition each of the ORG nodes into one or more ERG nodes. Method 1100 may then proceed to block 1110 and construct electrical-layer reachable paths between the ERG nodes by using an SPF algorithm. In contrast to the optical reachable paths in the ORG, the electrical-layer reachable paths may include regenerators. Moreover, different policies, such as load-balancing, diversity routing, and bandwidth admission control may be accounted for when constructing electrical-layer reachable paths.

Figure 12:
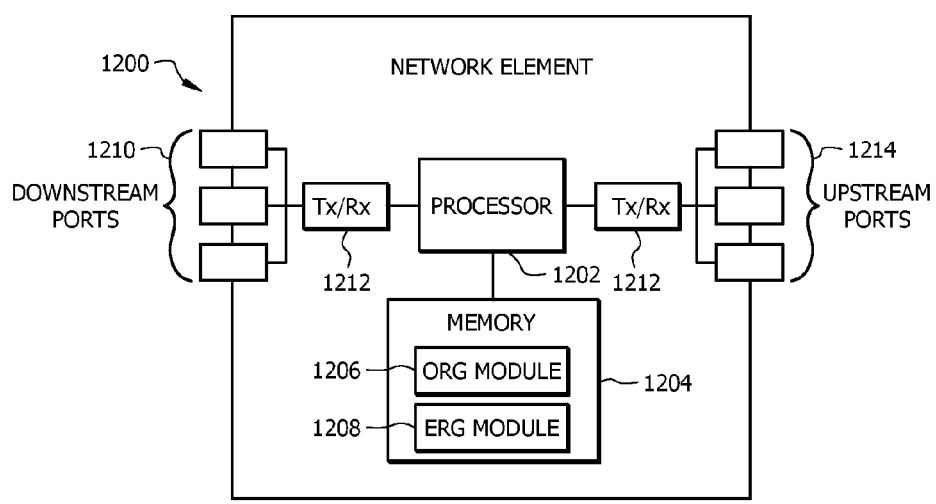
FIG. 12 is a schematic diagram of an embodiment of a network element.

At least some of the features/methods described in the disclosure may be implemented in a network element. For instance, the features/methods of the disclosure may be implemented using hardware, firmware, and/or software installed to run on hardware. The network element may be any device, e.g., PCE controller and network management system (NMS) that virtualizes optical networks transport functions to construct ORGs and ERGs. FIG. 12 is a schematic diagram of an embodiment of a network element 1200 that creates ORGs and ERGs for the transport networks 100 and 200 shown in FIGS. 1 and 2, respectively.

The network element 1200 may comprise one or more downstream ports 1210 coupled to a transceiver (Tx/Rx) 1212, which may be transmitters, receivers, or combinations thereof. The Tx/Rx 1212 may transmit and/or receive frames from other network nodes via the downstream ports 1210. Similarly, the network element 1200 may comprise another Tx/Rx 1212 coupled to a plurality of upstream ports 1214, wherein the Tx/Rx 1212 may transmit and/or receive frames from other nodes via the upstream ports 1214. The downstream ports 1210 and/or upstream ports 1214 may include electrical and/or optical transmitting and/or receiving components.

A processor 1202 may be coupled to the Tx/Rx 1212 and may be configured to process the frames and/or determine which nodes to send (e.g. transmit) the frames. In one embodiment, processor 1202 may comprise one or more multi-core processors and/or memory modules 1204, which may function as data stores, buffers, etc. The processor 1202 may be implemented as a general processor or may be part of one or more application specific integrated circuits (ASICs) and/or digital signal processors (DSPs). Although illustrated as a single processor, the processor 1202 is not so limited and may comprise multiple processors. The processor 1202 may be configured to implement any of the schemes described herein, including methods 1000 and 1100 as described in FIGS. 10 and 11, respectively.

FIG. 12 illustrates that memory module 1204 may be coupled to the processor 1202 and may be a non-transitory medium configured to store various types of data. Memory module 1204 may comprise memory devices including secondary storage, read only memory (ROM), and random access memory (RAM). The secondary storage is typically comprised of one or more disk drives, solid-state drives (SSDs), and/or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The memory module 1204 may be used to house the instructions for carrying out the system and methods described herein, e.g. as a centralized controller. In one embodiment, the memory module 1204 may comprise an ORG module 1206 that performs substantially the same functions as the ORG middleware module 302 in FIG. 3. The ERG module 1208 may be configured to perform functions described in method 1000 in FIG. 10 and may be implemented on the processor 1202. Alternately, the ORG module 1206 may be implemented directly on the processor 1202. The memory module 1204 may also comprise an ERG module 1208 that performs substantially the same functions as the ERG middleware module 302 in FIG. 3. The ERG module 1208 may be configured to perform functions described in method 1100 in FIG. 11.

It is understood that by programming and/or loading executable instructions onto the network element 1200, at least one of the processor 1202, the cache, and the long-term storage are changed, transforming the network element 1200 in part into a particular machine or apparatus, e.g. a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A computer program product comprising computer executable instructions stored on a non-transitory medium that when executed by a processor cause a node to:
    obtain an optical reachability graph (ORG) by abstracting resource information from a physical optical substrate layer;
    determine an optical-electrical-optical (OEO) conversion capability of an optical physical network by identifying a presence of regenerators or other OEO conversion nodes;
    partition a plurality of service sites into one or more electrical reachability graph (ERG) nodes based on the OEO conversion capability, the service sites are connected via a plurality of optical reachable paths to form the ORG;
    determine a grooming capability for each ERG node; and
    construct a plurality of electrical-layer reach paths among the ERG nodes based on the grooming capabilities to form an ERG.

2. The computer program product of claim 1, wherein the ERG is a part of a virtualization layer built above the optical physical network.

3. The computer program product of claim 1, wherein the instructions further cause the node to:
    map the ERG over the ORG; and
    map the ORG over the optical physical network.

4. The computer program product of claim 1, wherein the instructions further cause the node to create a virtual transport network (VTN) service interface using an open application programming interface (API).

5. An apparatus for virtualizing an optical network, the apparatus comprising:
    a memory; and
    a processor coupled to the memory and configured to:
        maintain optical transmission engineering rules for the optical network;
        maintain shared-risk link groups (SRLGs) for the optical network;
        determine a plurality of optical reachable paths using the optical transmission engineering rules and the SRLGs;
        construct an optical reachability graph (ORG) by interconnecting a plurality of ORG nodes via the optical reachable paths;
        partition the ORG nodes into a plurality of electrical reachability graph (ERG) nodes that perform grooming functions;
        determine a plurality of electrical-layer reachable paths for the ERG nodes; and
        construct an ERG over the ORG by interconnecting the ERG nodes with the electrical-layer reachable paths.

6. The apparatus of claim 5, wherein the processor is further configured to assign resources of the optical network to each electrical-layer reachable path.

7. The apparatus of claim 5, wherein the optical reachable paths correspond to physical fiber routes within the optical network, and wherein the processor is further configured to use a routing and wavelength assignment (RWA) algorithm to assign one or more wavelengths to the physical fiber routes.

8. The apparatus of claim 5, wherein the processor is further configured to use a shortest-path-first algorithm to determine regenerator placement along one or more of the optical reachable paths.

9. The apparatus of claim 5, wherein the processor is further configured to use the ERG and the ORG to determine placement of grooming resources.

10. A method implemented in a centralized controller node, the method comprising:
    obtaining an optical reachability graph (ORG) by abstracting resource information from a physical optical substrate layer;
    determining an optical-electrical-optical (OEO) conversion capability of an optical physical network by identifying a presence of regenerators or other OEO conversion nodes;
    partitioning a plurality of service sites into one or more electrical reachability graph (ERG) nodes based on the OEO conversion capability, the service sites are connected via a plurality of optical reachable paths to form the ORG;
    determining a grooming capability for each ERG node; and
    constructing a plurality of electrical-layer reach paths among the ERG nodes based on the grooming capabilities to form an ERG.

11. The method of claim 10, wherein the ERG is a part of a virtualization layer built above the optical physical network.

12. The method of claim 10, further comprising:
    mapping the ERG over the ORG; and
    mapping the ORG over the optical physical network.

13. The method of claim 10, further comprising creating a virtual transport network (VTN) service interface using an open application programming interface (API).

14. The apparatus of claim 5, wherein the optical reachable paths satisfy the optical transmission engineering rules for the optical network, and wherein the optical transmission engineering rules are based on at least one of fiber characteristics, dispersion compensation, wavelength-division multiplexing (WDM) engineering rules, and optical signal-to-noise ratio (OSNR).

15. The apparatus of claim 14, wherein the optical transmission engineering rules are further based on optical device constraints.

16. The apparatus of claim 5, wherein the ORG nodes and the ERG nodes are virtual nodes and not physical nodes.

17. The apparatus of claim 5, wherein the optical reachable paths explicitly exclude regenerators and other optical-electrical-optical (OEO) conversion nodes.

18. The apparatus of claim 5, wherein the processor is further configured to:
   obtain the optical-electrical-optical (OEO) conversion capability of the optical network;
   obtain a grooming capability for each ERG node; and
   further construct the ERG using the OEO conversion capability and the grooming capability for each ERG node.

* * * * *